(12) United States Patent
Moreton

(10) Patent No.: US 7,250,946 B1
(45) Date of Patent: Jul. 31, 2007

(54) SHARED N-PATCH EDGES

(75) Inventor: Henry P. Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/490,701

(22) Filed: Jul. 21, 2006

Related U.S. Application Data

(63) Continuation of application No. 10/706,057, filed on Nov. 12, 2003, now Pat. No. 7,142,206.

(60) Provisional application No. 60/461,154, filed on Apr. 8, 2003.

(51) Int. Cl.
*G06T 15/00* (2006.01)

(52) U.S. Cl. ............... 345/420; 345/419; 345/423; 703/2

(58) Field of Classification Search ............... 345/419, 345/423, 428, 420; 703/2
See application file for complete search history.

(56) References Cited

U.S. PATENT DOCUMENTS 5,014,230 A * 5/1991 Sinha et al. ............... 703/2

* cited by examiner

*Primary Examiner*—Phu K. Nguyen
(74) *Attorney, Agent, or Firm*—Patterson & Sheridan, L.L.P.

(57) ABSTRACT

Systems and methods for shaping a shared edge between two or more N-patches may be used to eliminate gaps when normal vectors along a shared edge are not equal. More particularly, vertices and normals of a polygon, tristip, quadstrip and so on, are obtained. Shared vertices corresponding to the shared edge are identified. When normal vectors at a shared vertex are determined to differ, tangents of the normal vectors are computed. These tangents may be used to optionally shape the shared edge, along with control points.

18 Claims, 9 Drawing Sheets

SHARED N-PATCH EDGES

CROSS-REFERENCE TO RELATED APPLICATIONS

This application is a continuation of U.S. patent application Ser. No. 10/706,057, filed Nov. 12, 2003, now U.S. Pat. No. 7,142,206 which claims benefit of U.S. provisional patent application Ser. No. 60/461,154, filed Apr. 8, 2003. Each of the aforementioned related patent applications is herein incorporated by reference.

BACKGROUND OF THE INVENTION

1. Field of the Invention

One or more aspects of the present invention relate generally to computer generated graphics, and more particularly to N-patches for forming computer graphic images.

2. Description of the Related Art

In graphics processing, it is well-known to generate a surface represented by a number of interconnected polygons. Conventionally, such polygons are triangles though other geometric shapes may be used.

To describe three-dimensional (3D) objects, High Order Surface (HOS) technologies may be employed. Rather than using polygons of first order surfaces, linear or flat surfaces, to describe curved lines of 3D objects, an HOS technology is used. An example of an HOS technology is an N-patch, though there are other types of HOS technologies, such as polynomial surfaces. For an N-patch, vectors normal ("normals") to a surface to be imaged at corners (vertices) of a triangle are conventionally used.

A problem with N-patches that share an edge is that a gap between shared edges can result when normal vectors along a shared edge are not equal. To fill such a gap, it may be tessellated with polygons. However, a tessellated gap often causes unwanted smoothing or smearing artifacts. Accordingly, it would be both desirable and useful to generate a shared N-patch edge that results in less unwanted smoothing or smearing than a prior N-patch shared edge. Furthermore, it would be both desirable and useful to generate a shared N-patch edge that exhibits fewer artifacts than a prior shared N-patch edge.

SUMMARY OF THE INVENTION

An aspect of the present invention is a method for shaping a shared edge between two N-patches. A first normal at a first shared vertex of the shared edge is obtained, and a second normal at the first shared vertex of the shared edge is obtained. A cross product for the first normal and the second normal is calculated to provide a tangent, wherein the tangent provides a projection for determining the shared edge.

An aspect of the present invention is a method for geometry generation. A model is obtained, and vector normals are determined for the model. A higher-order form of the model is produced, control points are added, and shared edges for the higher-order form of the model are identified. Shared edges of the higher-order form of the model are identified. Tangents for the higher-order form of the model responsive to the shared edges are determined, and the shared edges are shaped at least partially responsive to at least one of the tangents to reduce gaps at the shared edges.

An aspect of the present invention is a method for tessellation. A tessellator is provided and a polygon model is provided to the tessellator. The tessellator generates N-patches in response to the polygon model, identifies a shared edge between a first N-patch and a second N-patch, ascertains that a gap exists that includes the shared edge, and shapes the shared edge to reduce the gap.

Shaping a shared N-patch edge to reduce gaps between the N-patches based on normal vectors at shared vertices along the shared edge reduces unwanted smoothing or smearing compared by with filling gaps between N-patches with generated primitives.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
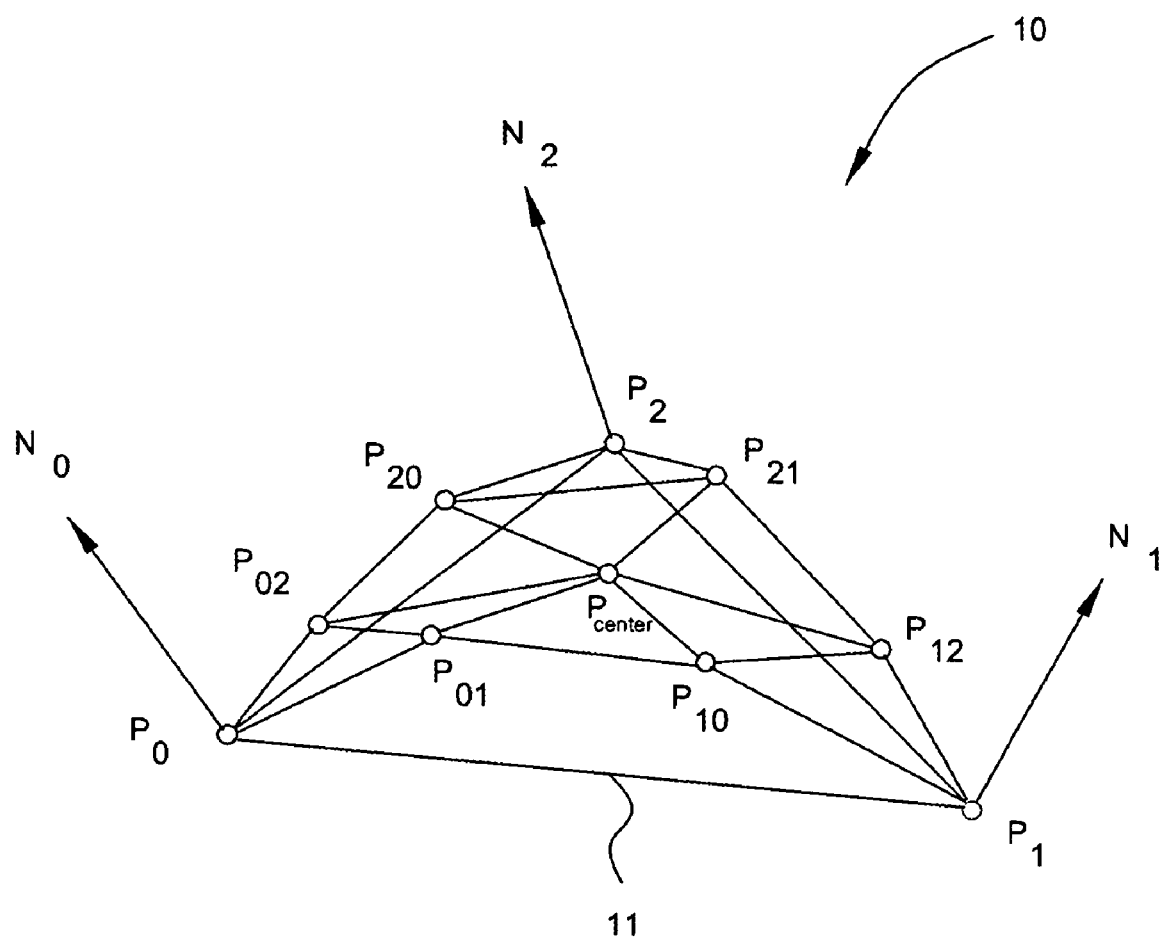
FIG. 1 is an N-patch diagram of an exemplary embodiment of an N-patch.

FIG. 1 is an N-patch diagram of N-patch 10. Triangle 11 comprises vertex positions $P_0$, $P_1$, and $P_2$. Respectively emanating from positions $P_0$, $P_1$ and $P_2$ are normals $n_0$, $n_1$, and $n_2$. Well-known equations are used to map control points, $P_{01}$, $P_{10}$, $P_{02}$, $P_{20}$, $P_{12}$, $P_{21}$ and $P_{center}$ from positions $P_0$, $P_1$, $P_2$ and normals $n_0$, $n_1$, $n_2$. Control points and positions (collectively, "control points") are used to define N-patch 10.

Figure 2:
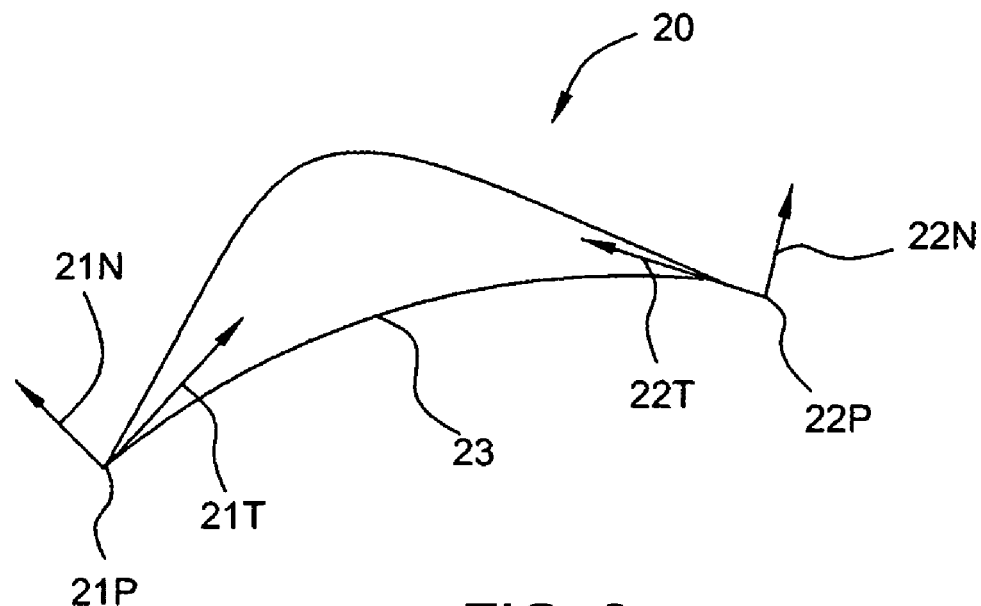
FIGS. 2 and 3 are N-patch diagrams of exemplary embodiments of N-patches shown with respective surface shapes.

FIG. 2 is an N-patch diagram of an exemplary embodiment N-patch 20 shown with a surface shape. Notably, the particular surface shape depicted in all N-patch diagrams herein is merely to illustrate that an N-patch is used to define a surface, and thus it should be understood that other surface shapes may be used depending on a graphic image to be generated. Furthermore, though a quadratic triangular Bezier N-patch is shown, other higher order surfaces may be used. Second order surfaces, such as quadratic or parabolic surface with a single bend, may be used and are conventionally defined by an equation of the form $y=ax^2+bx+c$. A third order surface is a surface having two bends in it, such as an S-shape, and is based on the cubic curve $y=ax^3+bx^2+cx+d$. By cubic, it is meant a third order surface. Moreover, surfaces with orders greater than third order surfaces may be used though computationally intensive.

N-patch 20 is located in part by positions 21P and 22P. Extending from positions 21P and 22P are normals 21N and 22N, respectively. Edge 23 is defined in part by positions 21P and 22P. Tangents to positions 21P and 22P with respect to surface planes to those respective positions are shown as tangents 21T and 22T.

Figure 3:
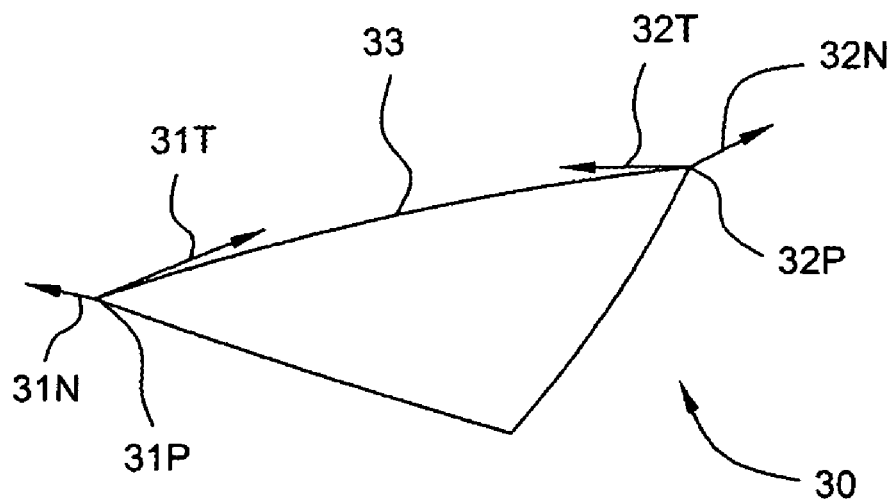

FIG. 3 is an N-patch diagram of N-patch 30 shown with a surface shape. N-patch 30 is positioned in part by positions 31P and 32P. Positions 31P and 32P partially define edge 33. Extending from positions 31P and 32P are respective normals 31N and 32N. Additionally, tangents 31T and 32T to surface planes at positions 31P and 32P are shown.

Figure 4:
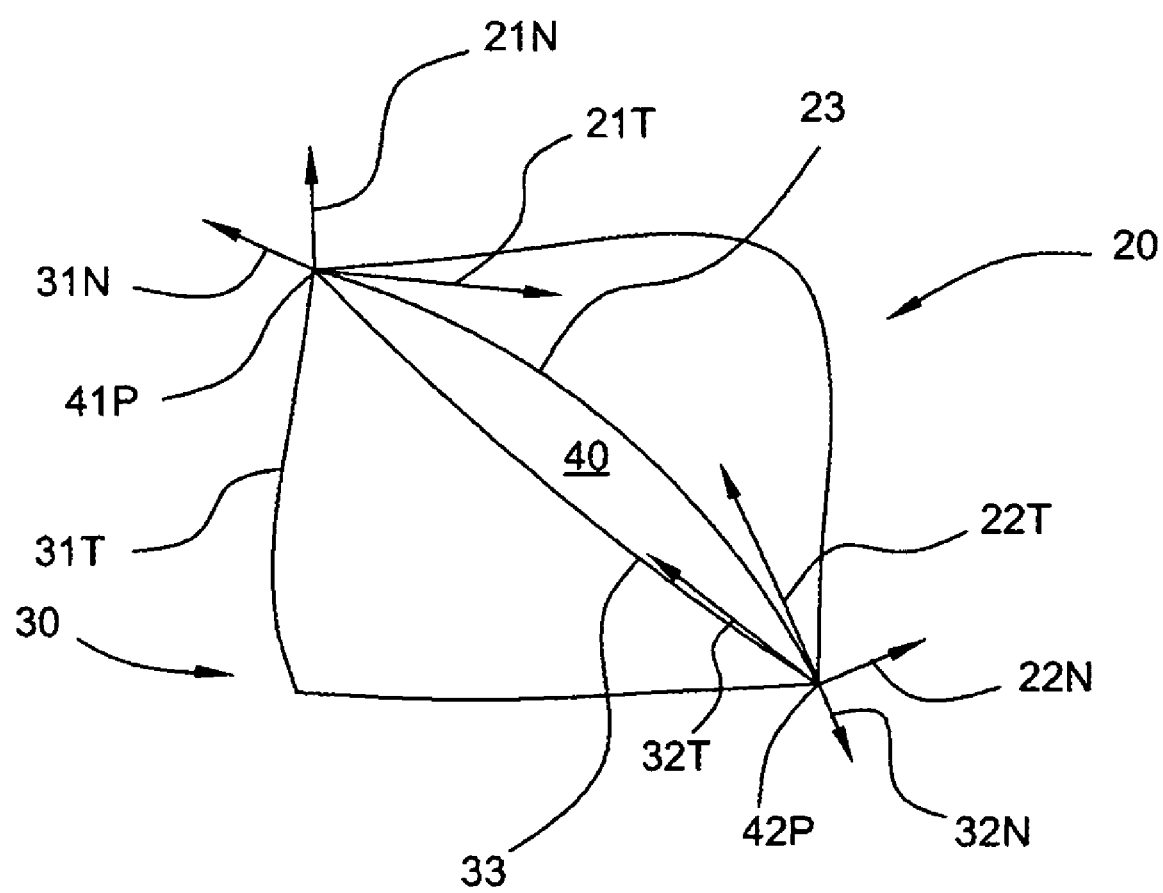
FIG. 4 is an N-patch diagram of the N-patches of FIGS. 2 and 3 connected at shared vertices having a gap between edges to be pulled together.

FIG. 4 is an N-patch diagram of N-patches 20 and 30 connected at positions at 41P and 42P. Positions 41P and 42P are equivalent to positions 21P, 31P and 22P, 32P, respectively. N-patches 20 and 30 border one another and should share an edge, namely, edges 23 and 33 should be imaged as one edge. However, a gap 40 between edges 23 and 33 does not accurately represent interconnected edges 23 and 33. In the past gap 40 was tessellated to fill it; however, such tessellation can create distortion due to distortion of coincident vertices. Additionally, in the past, such filling of gap 40 would produce texture smear and unwanted smoothing.

Gap 40 is produced even though N-patches 20 and 30 share edges 23 and 33 due to differing normals at end points of shared end points. Thus, normals 21N and 31N connected at end point 41P differ from one another, and normals 22N and 32N connected at end point 42P differ from one another. The intersection of two normals at a vertex may be thought of as the intersection at a point of two planes. In the example shown, these planes are part of surfaces of N-patches 20 and 30. By taking a cross product of two normals at a vertex, a tangent normal to the two normals results. This tangent lies along an intersection of two planes of which such normals are respectively orthogonal.

Figure 5:
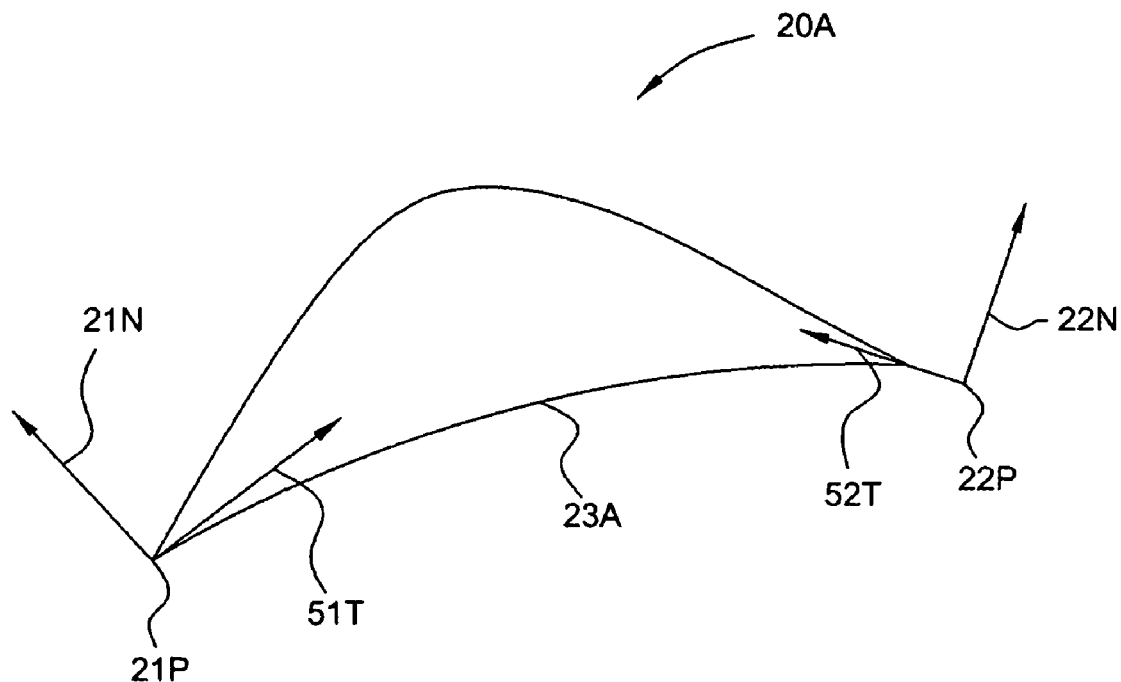
FIGS. 5 and 6 are N-patch diagrams of respective exemplary embodiments of N-patches in accordance with one or more aspects of the present invention.

FIG. 5 is an N-patch diagram of an exemplary embodiment of an N-patch 20A in accordance with one or more aspects of the present invention. N-patch 20A is similar to N-patch 20 of FIG. 2 except that edge 23A is different from edge 23. This is due to edge 23A being partially responsive to tangents 51T and 52T. Tangent 51T is determined by a cross product of normals 21N and 31N. Tangent 52T is determined by a cross product of normals 22N and 32N. Respective cross products for forming 51T and 52T are taken at vertices 21P and 22P, respectively.

Figure 6:
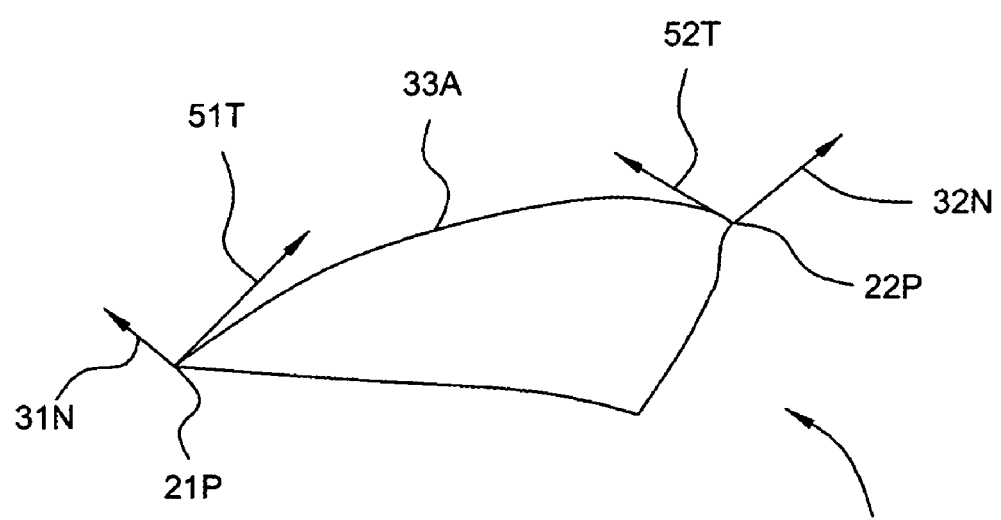

FIG. 6 is an N-patch diagram of an exemplary embodiment of an N-patch 30A in accordance with one or more aspects of the present invention. N-patch 30A is similar to N-patch 30 of FIG. 3 except edge 33A is different from edge 33. This is because edge 33A is formed partially responsive to tangents 51T and 52T.

Figure 7:
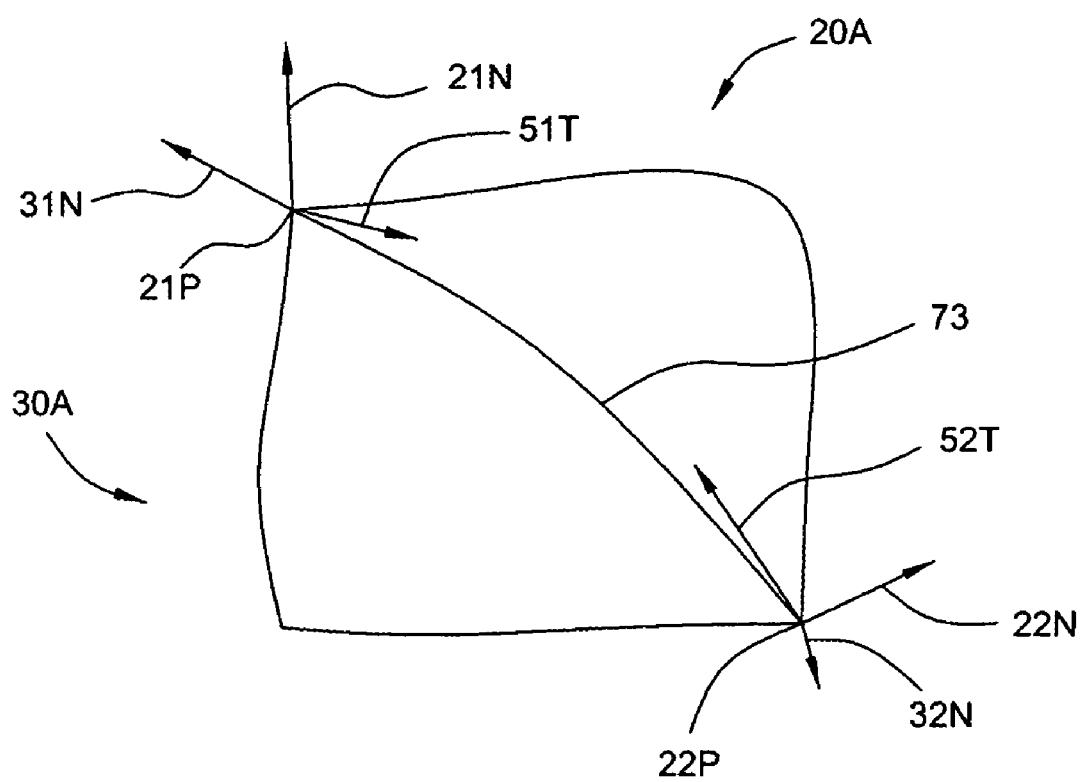
FIG. 7 is an N-patch diagram of the N-patches of FIGS. 5 and 6 having a shared edge in accordance with one or more aspects of the present invention.

FIG. 7 is an N-patch diagram of N-patches 20A and 30A having a shared edge 73 in accordance with one or more aspects of the present invention. Edge 73 is the intersection of edges 23A and 33A of FIGS. 5 and 6, respectively. Notably, gap 40 of FIG. 4 has been avoided or reduced, depending on level of resolution, without having to employ prior art gap filling tessellation. Advantageously, a crease, as indicated by edge 73, is visible at the intersection of surfaces of N-patches 20A and 30A. Notably, if edge 73 is a straight line formed responsive to tangents 51T and 52T, then forming edge 73 may be performed responsive to either of tangents 51T or 52T.

However, if edge 73 is a straight line or a substantially straight line, then overhead associated with determining tangents 51T and 52T may be avoided by having a dot product threshold. For example, if the dot product of normals 21N and 31N, or 22N and 32N, is one, then those normals are co-linear. So, by setting a dot product threshold to approximately 0.9, dot products approximately 0.9 or greater could be used to discard shared edges for normal cross product processing, as shared edges should align with minimal to no gapping. Dot products of normals, at a shared edge end point of separate N-patches, less than approximately 0.9 would be subsequently processed for their cross product to avoid or reduce gaps. In another embodiment, a user may specify whether or not a shared edge should be shaped or creased.

Figure 8:
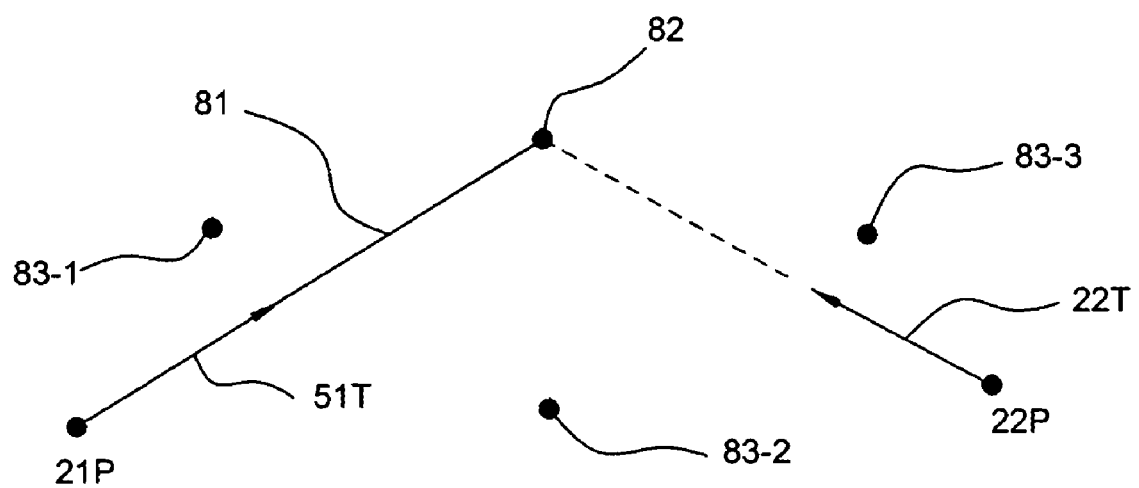
FIG. 8 illustrates a line formed from a vertex and a tangent where the line is subject to control points in accordance with one or more aspects of the present invention.

Shaping of edges formed by more than two tangents, especially edges that have one or more curves, is more difficult than shaping an edge that is a line. Control points along an edge, such as control points P01 and P10 (shown in FIG. 1), as well as vertices P0 and P1, may be used along with projection of a tangent or tangents to form a curved edge using recursive subdivision. FIG. 8 illustrates a line formed from a vertex and a tangent where the line is subject to control points in accordance with one or more aspects of the present invention. So, for example, a vertex 21P and a tangent 51T define line 81. Using vertex 22P at the other end of a shared edge, a proximal or closest point 82 on line 81 is found by a projection of point 22P onto line 81. A segment defined by points 21P and 82 forms a modified tangent. Similarly, a modified tangent may be determined originating at vertex 22P.

Control points, such as control points 83-1, 83-2 and 83-3 may be generated using a normal vector for each vertex and modified tangents, using techniques known to those skilled in the art. Control points are used to influence shaping of line 81. The strength of pull of each control point 83-1, 83-2 and 83-3 may be parametrically weighted by distance of such a control point to line 81, where influence increases with proximity. By proximity, it is not meant to exclude control points that lie on an affected line.

Figure 9A:
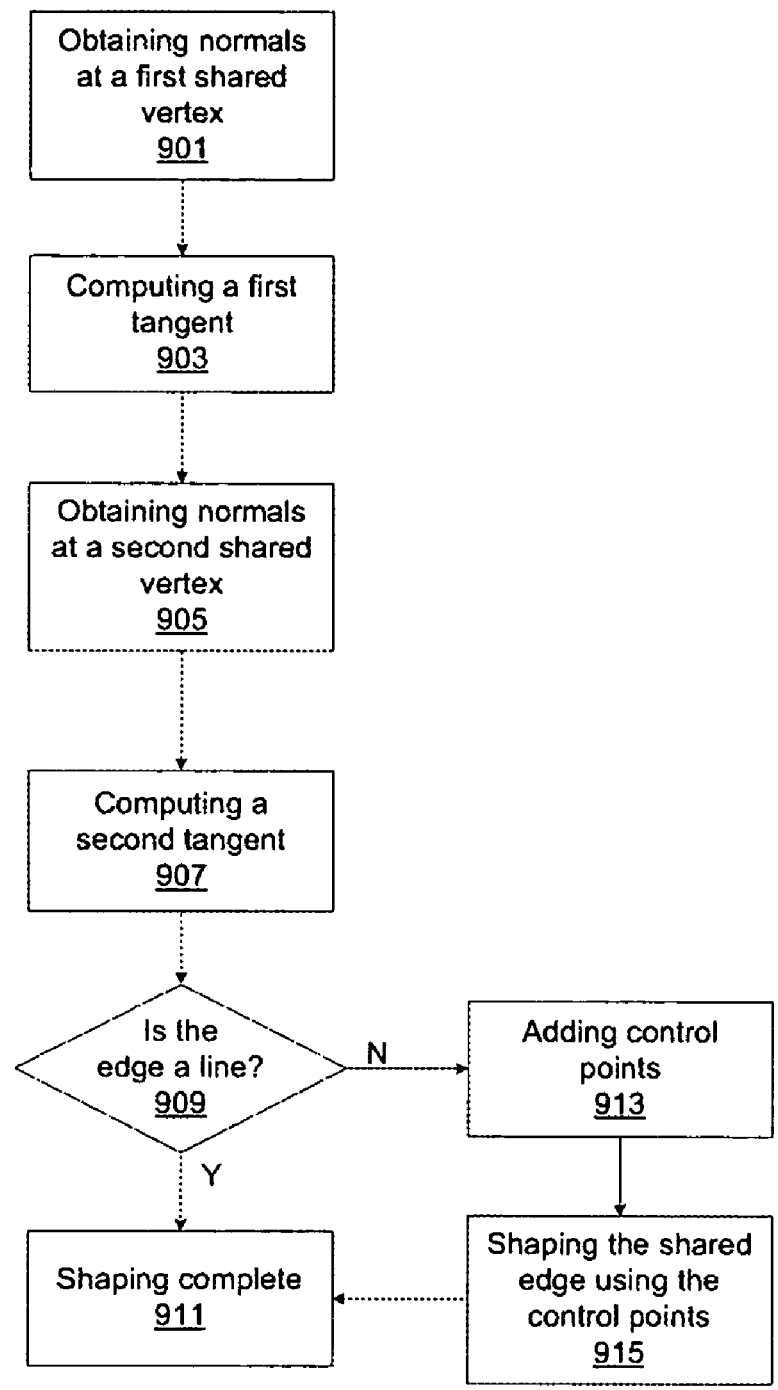
FIG. 9A is a process flow diagram of an exemplary embodiment of a method of shaping a shared edge between two N-patches in accordance with one or more aspects of the present invention.

FIG. 9A is a process flow diagram of an exemplary embodiment of a method of shaping a shared edge between two N-patches in accordance with one or more aspects of the present invention. The shared edge includes a first shared vertex and a second shared vertex. At 901, normal vectors at the first shared vertex are obtained. Normal vectors may be received as a portion of a model or normal vectors may be computed. At 903, a first tangent at the first shared vertex is determined by computing a cross-product of the normal vectors at the first shared vertex. At 905, normal vectors at the second shared vertex are obtained. At 907, a second tangent at the second shared vertex is determined by computing a cross-product of the normal vectors at the second shared vertex.

At 909, it is determined if the edge is a line, and, if not, at 913 one or more control points are added. At 915, the shared edge is shaped using the one or more control points and at 911 the shaping of the edge is complete. If, at 909, it is determined the edge is a line, at 911 the shaping of the edge is complete.

Figure 9B:
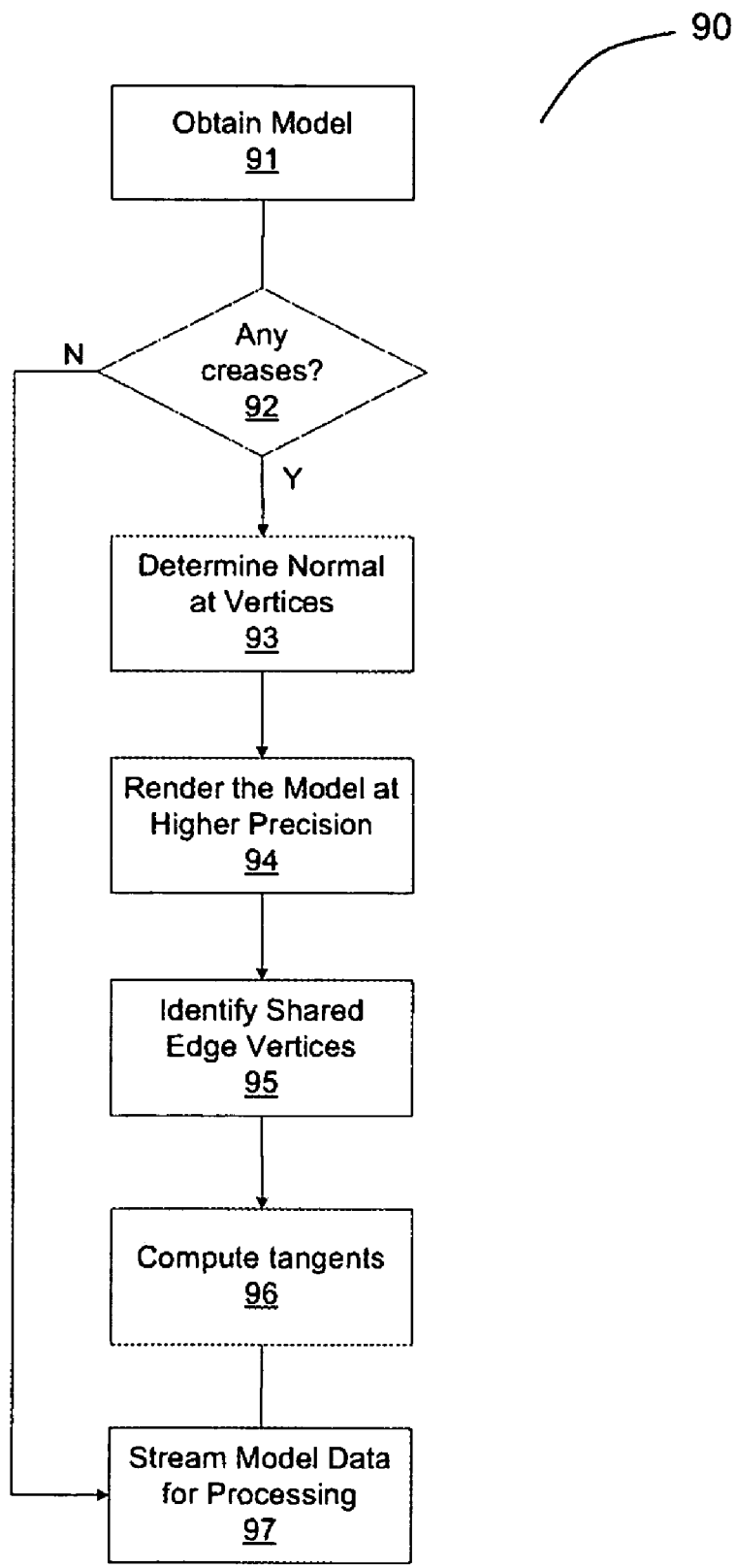
FIG. 9B is a process flow diagram of an exemplary embodiment of a shaping a shared edge between two N-patches geometry data generation process in accordance with one or more aspects of the present invention.

FIG. 9B is a process flow diagram of an exemplary embodiment of a geometry data generation process 90 in accordance with one or more aspects of the present invention. At 91, a model is obtained. Such a model will include at least one surface including one or more polygons. A polygon includes vertices defining position and may optionally include normals at each vertex. At 92, if edge shaping will not be performed, at 97 geometry data for the model is streamed for subsequent processing. If, at 92 edge shaping will be performed, at 93 normals for vertices of such a model are determined. At 94, a higher order version of the model may be produced by converting polygons, such as triangles, to polygons with additional reference points, such as N-patches with control points. Bezier curves may be associated with surface contours, including edges, of a tessellated polygon forming an N-patch. At 95, shared edge vertices are identified.

At 96, tangents are computed for shared edge vertices identified. Notably, some shared edge vertices need not have tangents added, for example if such a shared edge is not creased. Again, this can be determined by a dot product threshold, as mentioned above. A model converted to an N-patch model with tangents may originate as one or more triangle strips ("tristrips"), quadrilateral strips ("quadstrips"), and so on as well as a combination thereof. Tristrips may comprise a vertex common to two shared edges, where such a vertex will have a position and three normals, from which two tangents are generate. Quadstrips may comprise a vertex common to two shared edges, where such a vertex will have a position and two normals from which a tangent is generated. Accordingly, an Application Program Interface (API) may be configured to tessellate using one or more tristrips, quadstrips, individually assembled polygons, or some combination thereof. APIs, such as for OpenGL®, Direct3D®, and DirectDraw®, may be used. Furthermore, surfaces may be approximated for such one or more tristrips, quadstrips, individually assembled polygons, or some combination thereof using Bezier curves for same. APIs, such as for OpenGL®, Direct3D®, and DirectDraw®, may be used.

At 97, geometry data for a processed model having tangents is streamed for subsequent processing. Notably, such data may include null values in instances where tangents are not generated.

Therefore, it should be appreciated that tessellation may be initiated by specifying a base polygon, such as a triangle, with at least one normal per vertex (there is more than one normal per vertex for shared vertices in strips). Optionally, this model may be enhanced with the addition of control points, such as for an N-patch. Such a model or an enhanced model may be tessellated to a specified level, namely, the creation of subdivisions for each originating polygon. Normals for each subdivision may be determined, such as by linear interpolation, quadratic interpolation, plane equation, or Baricentric evaluation.

Figure 10:
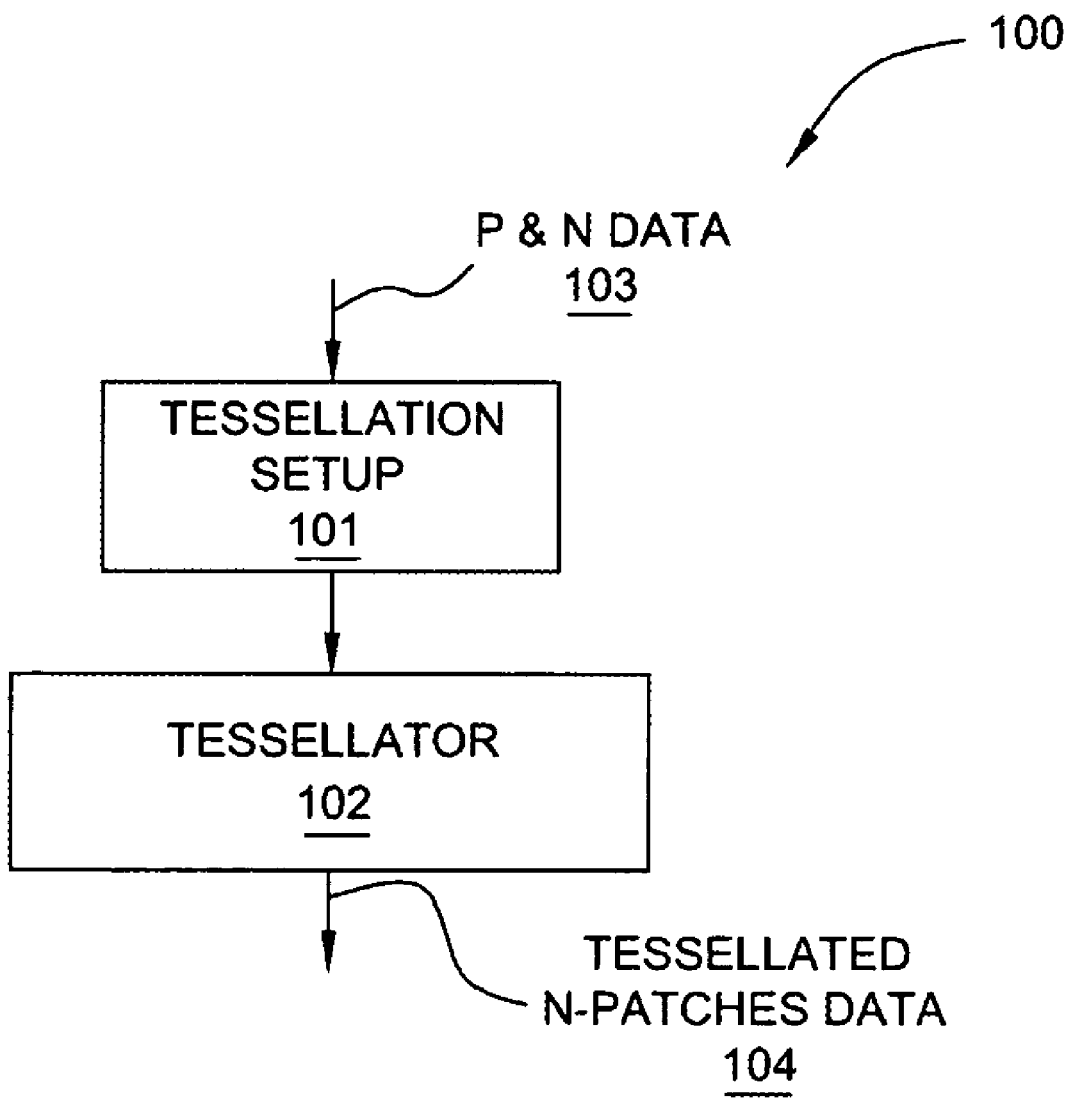
FIG. 10 is a block diagram of an exemplary embodiment of a portion of a graphics pipeline in accordance with one or more aspects of the present invention.

FIG. 10 is a block diagram of an exemplary embodiment of a portion of a graphics pipeline 100 in accordance with one or more aspects of the present invention. Graphics pipeline portion 100 comprises tessellation setup 101 and tessellator 102. Position and normal data 103 for a polygon, such as a triangle, is provided to tessellation setup 101. Tessellation setup 101 converts a polygon model into a higher-order version thereof, such as an N-patch. Tessellation setup 101 may use a tessellation factor to generate such a higher-order model for a number of subdivisions. Tessellator 102 identifies shared edge vertices, and calculates tangents for each from normals. Again, optionally, tessellator 102 may have a checker to determine in which instances tangent calculation may be avoided by determining whether a dot product exceeds an associated threshold value. For affected shared edges, tessellator 102 calculates tangents and uses control points from a higher-order model to determine a projection of a shared edge. Weighting of a tangent line with respect to control points is done with recursive subdivision. This may include one or more calculations, including an interior cubic position dot product, an exterior cubic position dot product, a linear interpolation, a Baricentric calculation, an interior quadratic normal dot product, and an exterior quadratic normal dot product. Tessellator 102 provides as output tessellated N-patches data 104.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method for tessellation, comprising:
providing a polygon model to a tessellator;
generating N-patches with the tessellator in response to the polygon model,
identifying a shared edge between a first N-patch and a second N-patch; and
ascertaining that a gap exists that includes the shared edge between the first N-patch and the second N-patch; and
shaping the shared edge to reduce the gap, wherein the step of shaping comprises:
taking a cross product of a first normal and a second normal at a common vertex of the shared edge
generating a tangent vector to a line of the edge from the common vertex, and
shaping the shared edge at least partially responsive to the tangent vector to diminish the gap.

2. The method of claim 1, wherein the ascertaining comprises:
computing a dot product, the dot product for a first normal of the first N-patch and a second normal of the second N-patch at a common vertex of the shared edge; and
determining that a scalar result of the dot product is less than a threshold value.

3. The method of claim 1, wherein the ascertaining comprises:
computing a dot product, the dot product for a first normal of the first N-patch and a second normal of the second N-patch at a common vertex of the shared edge; and
determining that a scalar result of the dot product is less than 0.9.

4. The method of claim 1, wherein at least one of the N-patches includes at least one control point.

5. The method of claim 4, wherein the dot product of the normal at the vertex influences the shaping of the shared edge to be shaped or creased.

6. A method for shaping a shared edge within a gap between a first N-patch and a second N-patch included in a displayed image, comprising:

obtaining a first normal at a first shared vertex of the shared edge for the first N-patch;

obtaining a second normal at the first shared vertex of the shared edge for the second N-patch;

computing a dot product of the first normal and the second normal;

determining that the shared edge should be shaped based on the dot product to reduce the gap between the first N-patch and the second N-patch, wherein the step of shaping comprises:

taking a cross product of a first normal and a second normal at a common vertex of the shared edge generating a tangent vector to a line of the edge from the common vertex, and shaping the shared edge at least partially responsive to the tangent vector to diminish the gap.

7. The method of claim 6, wherein the determining includes comparing the dot product to a threshold value and finding that the dot product is less than the threshold value, and if the dot product is less than the threshold, then tangents are not generated.

8. The method of claim 7, further comprising computing a cross product for the first normal and the second normal to produce a tangent at the first shared vertex.

9. The method of claim 8, further comprising shaping the shared edge to reduce the gap between the first N-patch and the second N-patch and establish a line, wherein the tangent provides a projection for determining the shared edge.

10. The method of claim 9, further comprising adding a control point for the shared edge based on the first shared vertex and a normal to the first shared vertex, the control point being added only if the edge is not a line.

11. The method of claim 10, further comprising shaping the shared edge to reduce the gap between the first N-patch and the second N-patch, wherein the control point is used along with the tangent for forming a curve of the shared edge using recursive subdivision.

12. The method of claim 11 wherein the influence of each of the control points on shaping the line is a function of distance to the line.

13. The method of claim 12 wherein the influence of a control point on the line increases as the control point is closer to the line.

14. The method of claim 9, further comprising:

obtaining a third normal at a second shared vertex of the shared edge for the first N-patch;

obtaining a fourth normal at the second shared vertex of the shared edge for the second N-patch;

computing a cross product for the third normal and the fourth normal to produce an additional tangent at the second shared vertex; and shaping the shared edge to reduce the gap between the first N-patch and the second N-patch, wherein the additional tangent provides another projection for determining the shared edge.

15. The method of claim 6, wherein the determining includes comparing the dot product to one and finding that the dot product is not equal to one.

16. A system for generating a surface for display using high order surface technology including N-patches comprising a graphics pipeline including:

a tessellation setup for receiving position and normal data for a polygon of the surface and converting the data into N-patches, and a tessellation operator configured to identify a shared edge between a first N-patch and a second N-patch;

ascertain that a gap exists that includes the shared edge between the first N-patch and the second N-patch;

shape the shared edge to reduce the gap wherein the shaping comprises:

take a cross product of a first normal and a second normal at a common vertex of the shared edge;

generate a tangent vector to a line of the edge from the common vertex; and shape the shared edge at least partially responsive to the tangent vector to diminish the gap.

17. The method of claim 16, wherein the ascertaining comprises:

computing a dot product for a first normal of the first N-patch and a second normal of the second N-patch at a common vertex of the shared edge; and determining that a scalar result of the dot product is less than a threshold value.

18. The method of claim 16, wherein the at least the dot product of the normal at the vertex influences the shaping of the shared edge to be shaped or creased.

* * * * *